T. W. SMITH.
HEATING SYSTEM.
APPLICATION FILED JULY 25, 1914.
1,135,730.
Patented Apr. 13, 1915.
2 SHEETS—SHEET 1.
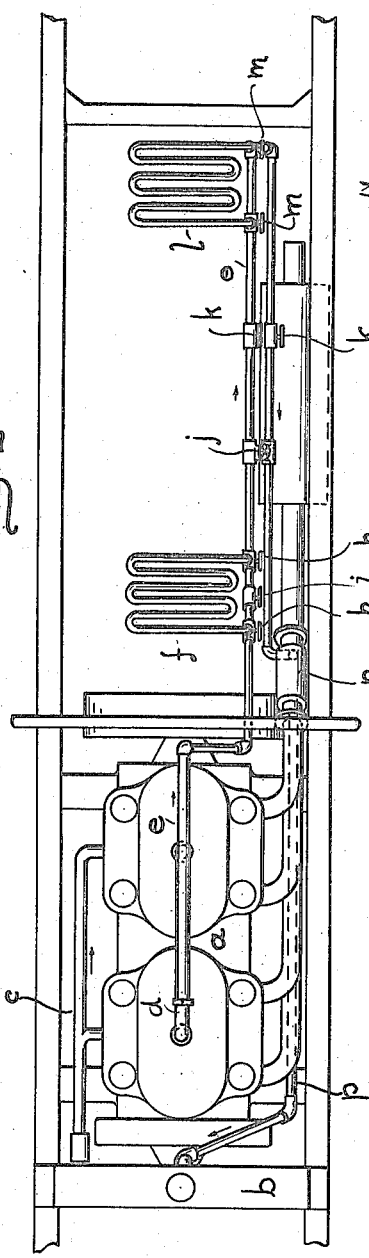
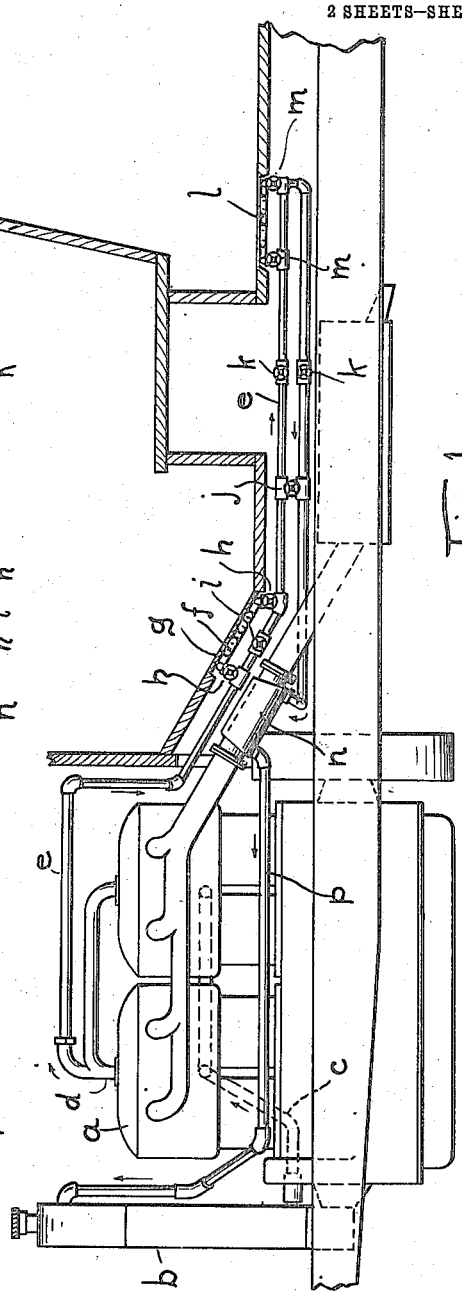
WITNESSES
INVENTOR
Thomas W. Smith
BY
ATTORNEY

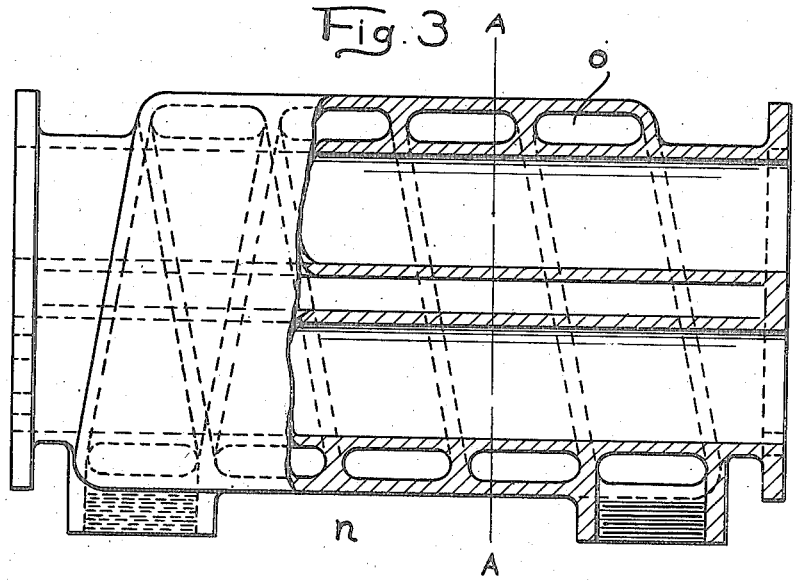
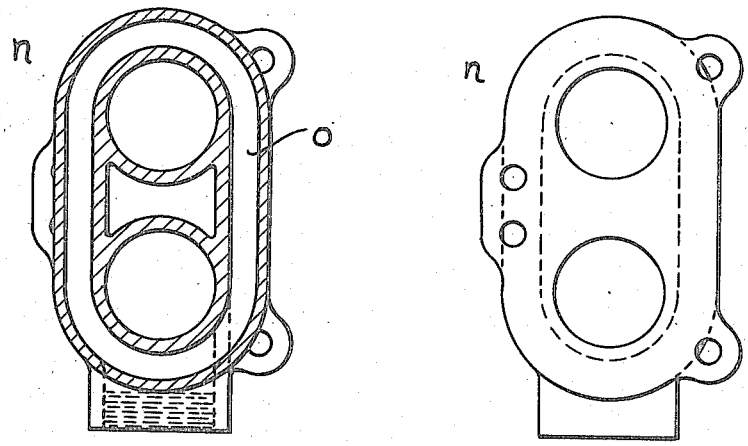

UNITED STATES PATENT OFFICE.

THOMAS W. SMITH, OF DETROIT, MICHIGAN.

HEATING SYSTEM.

1,135,730. Specification of Letters Patent. Patented Apr. 13, 1915.

Application filed July 25, 1914. Serial No. 853,226.

*To all whom it may concern:*

Be it known that I, THOMAS W. SMITH, citizen of the United States, residing at Detroit, county of Wayne, State of Michigan, have invented a certain new and useful Improvement in Heating Systems, and declare the following to be a full, clear, and exact description of the same, such as will enable others skilled in the art to which it pertains to make and use the same, reference being had to the accompanying drawings, which form a part of this specification.

This invention relates to heating systems for vehicles and especially for closed-body automobiles, motor-boats and the like.

It has heretofore been proposed to use the circulating water for cooling an internal combustion engine for the purpose of heating. Inasmuch as it is desirable to maintain the water in the jacket of an internal combustion engine at a definitely high temperature in order to secure the best results in the operation of the engine, one of the difficulties in the heating systems proposed is that in a car with a radiator built to keep the temperature of the water at a definite height the use of a heating system such as proposed materially lessens the temperature of the water so as to impair the operation of the engine.

It is the object of my invention to eliminate this difficulty by re-heating the water to a sufficient degree to substantially restore the heat lost by circulating in the heat coils.

In the drawings,—Figure 1, is a side elevation of part of an automobile showing a longitudinal section of the body. Fig. 2, is a plan view of the power plant, the frame and my heating system. Fig. 3, is a side elevation, partly in section, of the pipe section which I insert in the exhaust line. Fig. 4, is a section on the line A—A of Fig. 3. Fig. 5, is an end view of the pipe section.

The engine is lettered $a$.

The water jackets of the cylinder are connected with the radiator $b$ by the pipe $c$. The water leaves the water jackets by the pipe $d$ and at the point where the water leaves the last block of cylinders the piping in my system is first attached. This piping is designated $e$. The pipe $e$ leads to the heating coils or heating radiators $f$ just below the inclined floor forward of the front seat. It will be noticed that these heating coils are formed by convolutions parallel to the floor so as to take up as little room as possible. The opening in the floor to allow the escape of the heated air is protected by a grating $g$.

The valves $h$, $h$ cut off the heating coils from the piping $e$ but do not interfere with the travel of the water beyond the heating coils. Further travel of the water may be stopped by the valve $i$. A valve $j$ controls the short connecting pipe between the back-going pipe $e$ and the return piping so that when this valve is open and the valves $k$, $k$, just to the rear of it, are closed, the rear heating coils $l$ are shut off. The rear heating coils are provided with valves $m$, $m$ by which they may be closed from the main pipe $e$.

The return run of the main piping enters the exhaust section $n$. This is a special section of pipe which I place in the exhaust line. In some cars the exhaust is a pipe which is divided in two passages as shown in Figs. 3 and 4. Of course it does not make any difference whether the exhaust is a pipe for two passageways, or one, as far as my invention is concerned. This section is provided with a jacket on the outside which has a spiral passageway $o$. The length and proportions of these convolutions about the exhaust are calculated so that enough heat may be abstracted from the exhaust gases by the circulating water to substantially compensate for the heat that is ordinarily lost when the two heating coils are in operation. It is of course obvious that many other ways of bringing the return circulating water into proximity with the exhaust gases could be used so as to further heat the water and reestablish the temperature of the water as it leaves the water jackets.

From the exhaust pipe section the water is taken by the conduit $p$ to the top of the radiator $b$.

It is of course obvious that the circulating fluid may be other than water and still come within the spirit of my invention.

What I claim is:

1. A heating system of the class described, having in combination with a vehicle provided with a water-jacketed internal combustion engine having an exhaust pipe, of piping extending from the water jacket into the body of the vehicle and provided with a radiator, thence passing in adjacency to the exhaust pipe at a proximity and for a distance calculated to substantially restore the heat lost in the radiator, thence returning from the exhaust pipe to the engine jacket.

2. The combination of a vehicle provided with an internal combustion engine having an exhaust line and water jacket, of piping leading from the water jacket to the vehicle body and provided with one or more heating radiators in the body, the said exhaust line being provided with a pipe section having a spiral passageway of a length calculated to substantially restore the heat lost in the heating radiator, and the said piping leading from the said heating radiator into one end of said spiral passageway, and means for returning the water from the opposite end of said spiral passageway to the engine jacket.

3. A heating system of the class described, having in combination with a vehicle provided with a water-jacketed internal combustion engine having an exhaust pipe and provided with a radiator for cooling the circulating water, of piping extending from the water jacket into the body of the vehicle and provided with a radiator for heating the body, thence returning from the body and passing about the exhaust pipe a distance calculated to substantially restore the heat lost in the radiator in the body, and thence leading into the radiator intended for cooling the circulating water from whence the water is led to the water jacket.

In testimony whereof, I sign this specification in the presence of two witnesses.

THOMAS W. SMITH.

Witnesses:
   STUART C. BARNES,
   VIRGINIA C. SPRATT.